June 5, 1928.  H. D. FITZGERALD  1,672,679
COUPLING
Original Filed Aug. 11, 1923
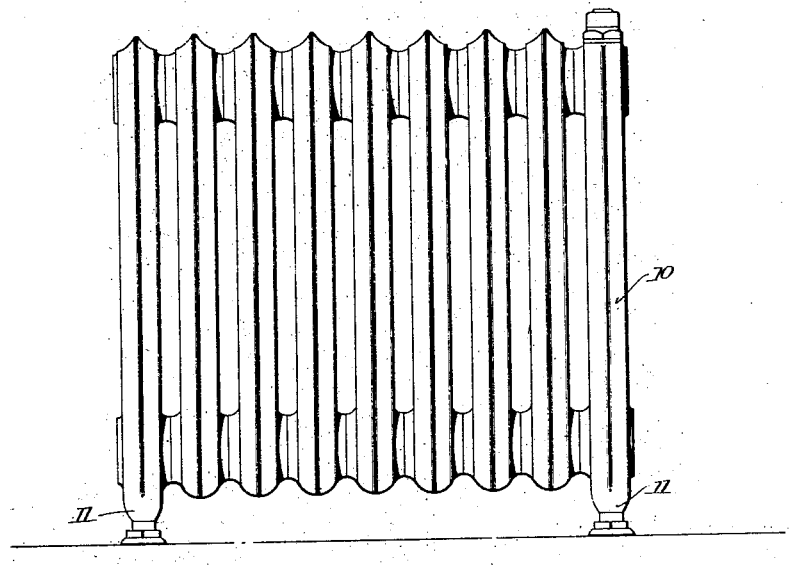
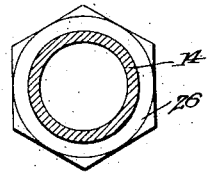
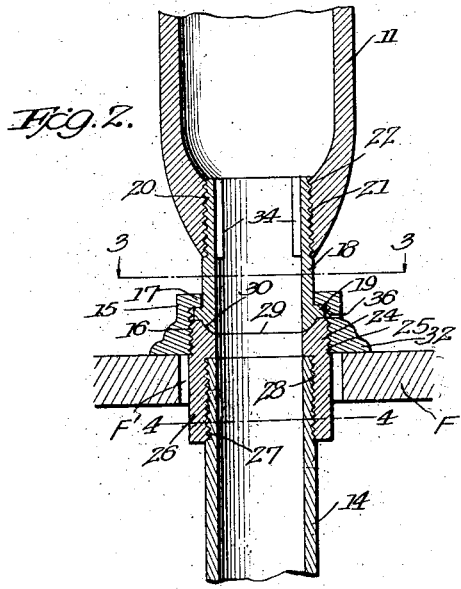
Inventor
H. D. Fitzgerald
Attorneys Patented June 5, 1928.

1,672,679

UNITED STATES PATENT OFFICE.

HAROLD D. FITZGERALD, OF DANVILLE, VIRGINIA.

COUPLING.

Application filed August 11, 1923, Serial No. 656,839. Renewed September 15, 1926.

This invention relates to pipe couplings, and has as its object the provision of a coupling intended, primarily, for use in connection with the radiator having inlet and outlet passages for the heating medium through hollow supporting legs, such a radiator being disclosed in my co-pending application, Ser. No. 643,038, filed June 2, 1923, although it will be understood that the invention is not limited to this particular application but is useful in plumbing work generally.

An object of the invention is to provide a pipe coupling which includes a collar serving to join the sections thereof and having means whereby the same may serve also as an escutcheon plate to engage the floor or other support around an opening through which the piping extends.

A further object of the invention is to construct the coupling so that the collar will support the radiator, or other plumbing fixture to which the pipe line is connected, by the coupling.

An additional object of the invention resides in the provision of means located, preferably, upon the collar for quickly indicating leakage at the coupling.

Referring to the drawings, wherein there is shown a preferred embodiment of the invention:—

Fig. 1 is an elevational view of a radiator showing the invention applied thereto, Fig. 2 is a vertical section of the coupling secured in position, Fig. 3 is a horizontal section on the line 3—3 of Fig. 2, and Fig. 4 is a horizontal section on the line 4—4 of Fig. 2.

Referring to the drawings for a more detailed description, 10 indicates a radiator formed of a plurality of sections, the end sections having hollow legs 11 through which the heating medium, such as steam or water, may enter and leave the radiator.

One of the couplings constituting the present invention serves to connect each leg with a pipe section 14. The coupling comprises a collar 15 internally threaded, as at 16, and having a projection 17, in the present instance a flange, extending into its bore. A connection member 18 has a circumferential projection, for example shown as a flange 19, abutting the flange 17 within the collar, the connection member being insertible through the collar and having threads 20 adapted to engage threads 21 within the opening leading into the radiator.

A second connection member 24 is provided with peripheral threading 25 which engages the threads within the collar 15; and has an angular peripheral portion 26 so that the same may be gripped by a wrench and fitted upon the end of the pipe section 14, the latter being threaded, as at 27, to engage internal threads 28 within the connection member 24.

It will be noted that the coupling connection members make a joint 29 within the collar 15, the connection member 18 having an externally beveled portion 30 fitting within a correspondingly beveled internal seat upon the connection member 24.

The collar 15 serves to tighten the joint 29 and is of angular contour, as indicated in Fig. 3, so that the same may be turned by suitable tools. The collar is also provided with an integral circumferential flange 32 which engages the surface of the floor F, or other suitable support around an opening F' therein, through which the pipe section 14 and a portion of the coupling extend. The collar thus serves as a combined coupling collar and an escutcheon plate and, additionally, supports the radiator 10 or other plumbing fixture in connection with which the coupling may be employed. By forming the flange integral with the collar the coupling is reinforced, as the flange serves to thicken the wall of the collar. When the coupling is employed as a support for a radiator the flange will receive the weight of the radiator and there is less danger of the internal threads of the collar being stripped than if the flange were simply secured to the collar. If desired, the under surface of the flange may be slightly concave so that the same will, around its outer edge, snugly fit an irregular floor or other rough surface, thereby making a better finish.

In placing the coupling in position the connection member 18 may be first inserted within the collar 15 and then fitted within the opening 22 of the radiator, internal lugs 34 being provided so that the same may be rotated by means of a suitable tool. The connection member 24 is fitted upon the pipe section and thereafter the two connection members are joined by threading the collar 15 upon the connection member 24. As the collar is rotated the joint 29 is made tight so that the fluid passing through the coupling will not leak therethrough. As this joint is concealed it will be found desirable to provide in the collar, preferably on the same horizontal plane with the joint, an opening 36 extending through the wall of the collar and communicating with the bore thereof. Should there be any leakage at the joint the fluid will first pass through the opening 36, which is the path of least resistance, and thereby indicate to the fitter the necessity for giving further attention to the tightening of the coupling. It will be noted that while the coupling is being set up, the weight of the radiator will be carried by the two members of the coupling independently of the uniting collar and escutcheon plate which will not receive the weight until the joint has been completed, and the under surface of the collar bears against the floor or other support. It is, of course, desirable that the tightening member be freely adjustable, which would not be possible if the weight of the radiator or other device is carried by the same while the joint is being completed. It will be understood that numerous modifications may be made in the precise construction disclosed and described without departing from the scope of the invention, which is defined in the following claims.

I claim:

1. A pipe coupling adapted to serve as a support for a radiator or the like comprising a connection member threaded at one end, a circumferential extension adjacent the other end of said member, a combined collar and escutcheon plate through the bore of which said member is freely insertible, said collar being freely rotatable on said member and having an internal projection adapted to abut said extension and having threading thereon, and a second connection member threaded to engage the threads of said collar and having additional threads to engage a pipe section, said collar having a peripheral flange adapted to engage a floor or other surface around an opening therethrough and angularly formed for engagement and rotation by a tool.

2. A pipe coupling adapted to serve as a support for a radiator or the like comprising a connection member threaded at one end, a circumferential extension adjacent the other end of said member, a combined collar and escutcheon plate through the bore of which said member is insertible, said collar having an internal projection adapted to abut said extension and threading thereon, and a second connection member threaded to engage the threads of said collar and having additional threads to engage a pipe section, said collar having an angular periphery and a peripheral flange adapted to engage a floor or other surface around an opening therethrough.

3. A pipe coupling adapted to serve as a support for a radiator or the like comprising a connection member threaded at one end, a circumferential extension adjacent the other end of said member, a combined collar and escutcheon plate through the bore of which said member is insertible, said collar having an internal projection adapted to abut said extension and threading thereon, and a second connection member threaded to engage the threads of said collar and having additional threads to engage a pipe section, said collar having an angular periphery and an exterior flange adapted to engage a floor or other surface around an opening therethrough, said threading and flange on the collar being in the same plane whereby the flange reinforces the threading.

4. A pipe coupling of the class described comprising a combined collar and escutcheon plate having a threaded bore, a projection extending into said bore, a peripheral flange on said collar of substantial extent and adapted to engage a floor or other surface around an opening therethrough and to support a plumbing fixture, a connection member threaded adjacent one end and having adjacent its other end a circumferential extension adapted to engage the projection within said bore, said member being insertible through the collar, a second connection member having a peripheral threading thereon adapted to engage the threads within said collar and escutcheon plate and having additional threading to engage a pipe section, said connection members making an end to end substantially butt joint within said collar.

5. A pipe coupling of the class described comprising a combined collar and escutcheon plate having a threaded bore, a projection extending into said bore, a peripheral flange on said collar of substantial extent and adapted to engage a floor or other surface around an opening therethrough and to support a plumbing fixture, said collar having a passage through the wall thereof and opening into said bore, a connection member threaded adjacent one end and having adjacent its other end a circumferential extension adapted to engage the projection within said bore, said member being insertible through the collar, a second connection member having a peripheral threading thereon adapted to engage the threads within said collar and escutcheon plate and having additional threading to engage a pipe section, said connection members making a joint within said collar.

6. A pipe coupling adapted to serve as a support for a radiator or the like comprising a combined coupling collar and escutcheon plate having an internally threaded bore, and a flange projecting into said bore, a peripheral flange on said collar of substantial extent and adapted to engage the surface of a floor or other support around an opening therethrough and to support a radiator, a connection member exteriorly threaded and freely insertible through said collar, said connection member having an exterior flange adapted to engage the flange within said collar, a second connection member threaded to engage a pipe section and having threads adapted to engage the threads within said collar, said connection members making a joint within the collar and the collar being angularly formed for engagement and rotation by a tool.

7. A pipe coupling of the class described comprising a combined coupling collar and escutcheon plate having an internally threaded bore, and a flange projecting into said bore, a peripheral flange on said collar of substantial extent and adapted to engage the surface of a floor or other support around an opening therethrough and to support a radiator, said collar having a passage through the wall thereof opening into said bore, a connection member exteriorly threaded and insertible through said collar, said connection member having an exterior flange adapted to engage the flange within said collar, a second connection member threaded to engage a pipe section and having threads adapted to engage the threads within said collar, said connection members making a joint within the collar.

8. A hollow leg for a radiator comprising a circumferential flange adapted to engage the surface of a floor or other support around a pipe opening, and to cover said opening, a section adapted to be secured to a radiator, a section adapted to be secured to a pipe line, with the ends of said sections forming a joint therebetween, and means on one of said sections and detachable therefrom for securing together said sections.

9. A hollow leg for a radiator comprising a circumferential flange adapted to engage the surface of a floor or other support around a pipe opening and to cover said opening, a section adapted to be secured to a radiator, a section adapted to be secured to a pipe line, with the ends of said sections forming a joint, and a rotatable collar on one section adapted to effect threaded engagement with the other section to secure said sections together, said collar being freely withdrawable from said section upon which it is rotatably mounted.

10. A hollow leg for a radiator comprising a circumferential flange adapted to engage the surface of a floor or other support around a pipe opening and to cover said opening, a section adapted to be secured to a radiator, a section adapted to be secured to a pipe line, with the ends of said sections forming a joint, and a rotatable collar on one section adapted to effect threaded engagement with the other section to secure said sections together, said collar having an inwardly disposed flange adapted to abut an outwardly directed flange on the section upon which it is rotatably mounted, said section being freely withdrawable through said collar in one direction whereby the collar and section are detachable.

In testimony whereof I have hereunto set my hand.

HAROLD D. FITZGERALD.